(12) United States Patent
Weiss et al.

(10) Patent No.: US 7,733,962 B2
(45) Date of Patent: Jun. 8, 2010

(54) RECONSTRUCTED FRAME CACHING

(75) Inventors: Rebecca C. Weiss, Menlo Park, CA (US); Geoffrey T. Dunbar, Kirkland, WA (US); Niranjan S. Nayak, Bellevue, WA (US); Sohail Baig Mohammed, Redmond, WA (US); Thomas W. Holcomb, Bothell, WA (US); Chih-lung Bruce Lin, Redmond, WA (US); Olivier Colle, Redmond, WA (US); Gareth Alan Howell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1528 days.

(21) Appl. No.: 10/730,534

(22) Filed: Dec. 8, 2003

(65) Prior Publication Data
US 2006/0184684 A1   Aug. 17, 2006

(51) Int. Cl.
*H04N 7/12* (2006.01)
*H04N 7/26* (2006.01)
(52) U.S. Cl. ................... 375/240.25; 386/124
(58) Field of Classification Search ............ 375/240.25, 375/240.28; 382/132; 709/224; 714/48; 345/473; 704/201; 386/111, 124
See application file for complete search history.

(56) References Cited

U.S. PATENT DOCUMENTS

| | | | |
|---|---|---|---|
| 5,140,437 A * | 8/1992 | Yonemitsu et al. .......... 386/111 | |
| 5,420,801 A | 5/1995 | Dockter et al. | |
| 5,528,281 A | 6/1996 | Grady et al. | |
| 5,539,886 A | 7/1996 | Aldred et al. | |
| 5,546,584 A | 8/1996 | Lundin et al. | |
| 5,574,934 A | 11/1996 | Mirashrafi et al. | |
| 5,577,258 A | 11/1996 | Cruz et al. | |
| 5,604,843 A | 2/1997 | Shaw et al. | |
| 5,625,404 A | 4/1997 | Grady et al. | |
| 5,675,752 A | 10/1997 | Scott et al. | |
| 5,712,906 A | 1/1998 | Grady et al. | |
| 5,764,965 A | 6/1998 | Poimboeuf et al. | |
| 5,765,011 A | 6/1998 | Wilkinson et al. | |
| 5,786,814 A | 7/1998 | Moran et al. | |
| 5,802,283 A | 9/1998 | Grady et al. | |
| 5,815,689 A | 9/1998 | Shaw et al. | |
| 5,878,431 A | 3/1999 | Potterveld et al. | |
| 5,886,274 A | 3/1999 | Jungleib | |
| 5,887,139 A | 3/1999 | Madison, Jr. et al. | |

(Continued)

FOREIGN PATENT DOCUMENTS

EP    0784271 (A2)    7/1997

(Continued)

OTHER PUBLICATIONS

Chatterjee, et al., "Microsoft DirectShow: A New Media Architecture", SMPTE Journal, Dec. 1997, pp. 865-871.

(Continued)

*Primary Examiner*—Gims S Philippe
(74) *Attorney, Agent, or Firm*—Lee & Hayes, PLLC (57) ABSTRACT

Systems and methods for processing input media in a computing device are described. In one aspect, a reconstructed frame is cached according to a set of criteria. A request to scrub to a predictive frame of input media is received. Responsive to receiving the request, the predictive frame is decoded starting with the reconstructed frame.

10 Claims, 5 Drawing Sheets

U.S. PATENT DOCUMENTS

| | | | |
|---|---|---|---|
| 5,892,767 A | 4/1999 | Bell et al. | |
| 5,936,643 A | 8/1999 | Tindell et al. | |
| 5,987,628 A * | 11/1999 | Von Bokern et al. | 714/48 |
| 5,995,512 A | 11/1999 | Pogue, Jr. | |
| 5,996,015 A | 11/1999 | Day et al. | |
| 6,014,706 A | 1/2000 | Cannon et al. | |
| 6,038,625 A | 3/2000 | Ogino et al. | |
| 6,044,408 A | 3/2000 | Engstrom et al. | |
| 6,178,172 B1 | 1/2001 | Rochberger | |
| 6,185,612 B1 | 2/2001 | Jensen et al. | |
| 6,192,354 B1 | 2/2001 | Bigus et al. | |
| 6,209,041 B1 | 3/2001 | Shaw et al. | |
| 6,243,753 B1 | 6/2001 | Machin et al. | |
| 6,262,776 B1 | 7/2001 | Griffits | |
| 6,263,486 B1 | 7/2001 | Boezeman et al. | |
| 6,266,053 B1 | 7/2001 | French et al. | |
| 6,279,029 B1 | 8/2001 | Sampat et al. | |
| 6,308,216 B1 | 10/2001 | Goldszmidt et al. | |
| 6,317,131 B2 | 11/2001 | Basso et al. | |
| 6,321,252 B1 | 11/2001 | Bhola et al. | |
| 6,343,313 B1 | 1/2002 | Salesky et al. | |
| 6,347,079 B1 | 2/2002 | Stephens et al. | |
| 6,369,835 B1 | 4/2002 | Lin | |
| 6,385,201 B1 | 5/2002 | Iwata | |
| 6,389,467 B1 | 5/2002 | Eyal | |
| 6,430,526 B1 | 8/2002 | Toll | |
| 6,457,052 B1 | 9/2002 | Markowitz et al. | |
| 6,466,971 B1 | 10/2002 | Humpleman et al. | |
| 6,536,043 B1 | 3/2003 | Guedalia | |
| 6,539,163 B1 | 3/2003 | Sheasby et al. | |
| 6,546,426 B1 | 4/2003 | Post | |
| 6,549,932 B1 | 4/2003 | McNally et al. | |
| 6,581,102 B1 | 6/2003 | Amini et al. | |
| 6,594,699 B1 | 7/2003 | Sahai et al. | |
| 6,594,773 B1 | 7/2003 | Lisitsa et al. | |
| 6,618,752 B1 | 9/2003 | Moore et al. | |
| 6,625,643 B1 | 9/2003 | Colby et al. | |
| 6,658,477 B1 | 12/2003 | Lisitsa et al. | |
| 6,684,331 B1 | 1/2004 | Srivastava | |
| 6,687,664 B1 * | 2/2004 | Sussman et al. | 704/201 |
| 6,691,312 B1 | 2/2004 | Sen et al. | |
| 6,694,368 B1 | 2/2004 | An et al. | |
| 6,711,171 B1 | 3/2004 | Dobbins et al. | |
| 6,725,274 B1 | 4/2004 | Slik | |
| 6,725,279 B1 | 4/2004 | Richter et al. | |
| 6,757,735 B2 | 6/2004 | Apostolopulos et al. | |
| 6,802,019 B1 | 10/2004 | Lauder | |
| 6,810,526 B1 | 10/2004 | Menard et al. | |
| 6,823,225 B1 | 11/2004 | Sass | |
| 6,920,181 B1 * | 7/2005 | Porter | 375/240.28 |
| 6,957,430 B2 | 10/2005 | Fant et al. | |
| 6,975,752 B2 * | 12/2005 | Dixon et al. | 382/132 |
| 7,024,483 B2 | 4/2006 | Dinker et al. | |
| 7,035,858 B2 | 4/2006 | Dinker et al. | |
| 7,047,554 B1 | 5/2006 | Lortz | |
| 7,076,564 B2 | 7/2006 | To et al. | |
| 7,124,424 B2 | 10/2006 | Gordon et al. | |
| 7,139,925 B2 | 11/2006 | Dinker et al. | |
| 7,197,535 B2 | 3/2007 | Salesky et al. | |
| 7,206,854 B2 | 4/2007 | Kauffman et al. | |
| 7,240,325 B2 | 7/2007 | Keller | |
| 7,246,318 B2 | 7/2007 | Debique et al. | |
| 7,290,057 B2 | 10/2007 | Saunders et al. | |
| 7,299,485 B2 | 11/2007 | Chaney et al. | |
| 7,415,537 B1 | 8/2008 | Maes | |
| 7,426,637 B2 | 9/2008 | Risan et al. | |
| 2001/0000962 A1 | 5/2001 | Rajan | |
| 2001/0024455 A1 | 9/2001 | Thaler et al. | |
| 2002/0085581 A1 | 7/2002 | Hauck et al. | |
| 2002/0099842 A1 | 7/2002 | Jenning | |
| 2002/0123997 A1 | 9/2002 | Loy et al. | |
| 2002/0158897 A1 | 10/2002 | Besaw et al. | |
| 2002/0174425 A1 | 11/2002 | Markel et al. | |
| 2002/0199031 A1 | 12/2002 | Rust et al. | |
| 2003/0028643 A1 | 2/2003 | Jabri | |
| 2003/0033424 A1 | 2/2003 | Gould | |
| 2003/0056029 A1 | 3/2003 | Huang et al. | |
| 2003/0093568 A1 | 5/2003 | Deshpande | |
| 2003/0095504 A1 | 5/2003 | Ogier | |
| 2003/0101253 A1 | 5/2003 | Saito et al. | |
| 2003/0123659 A1 | 7/2003 | Forstrom et al. | |
| 2003/0146915 A1 * | 8/2003 | Brook et al. | 345/473 |
| 2003/0149772 A1 | 8/2003 | Hsu et al. | |
| 2003/0158957 A1 | 8/2003 | Abdolsalehi | |
| 2003/0177292 A1 | 9/2003 | Smirnov et al. | |
| 2003/0215214 A1 | 11/2003 | Ma | |
| 2003/0231867 A1 | 12/2003 | Gates et al. | |
| 2003/0236892 A1 | 12/2003 | Coulombe | |
| 2003/0236906 A1 | 12/2003 | Klemets et al. | |
| 2004/0001106 A1 | 1/2004 | Deutscher et al. | |
| 2004/0004631 A1 | 1/2004 | Debique et al. | |
| 2004/0031058 A1 | 2/2004 | Reisman | |
| 2004/0042413 A1 | 3/2004 | Kawamura et al. | |
| 2004/0073596 A1 | 4/2004 | Kloninger et al. | |
| 2004/0073912 A1 | 4/2004 | Meza | |
| 2004/0080504 A1 | 4/2004 | Salesky et al. | |
| 2004/0139157 A1 | 7/2004 | Neely et al. | |
| 2004/0177162 A1 | 9/2004 | Wetzel et al. | |
| 2004/0207723 A1 | 10/2004 | Davis et al. | |
| 2004/0208132 A1 | 10/2004 | Neulist et al. | |
| 2004/0220926 A1 | 11/2004 | Lamkin et al. | |
| 2004/0230659 A1 | 11/2004 | Chase | |
| 2004/0236945 A1 | 11/2004 | Risan et al. | |
| 2004/0267778 A1 | 12/2004 | Rudolph et al. | |
| 2004/0267899 A1 | 12/2004 | Rahman et al. | |
| 2004/0267953 A1 | 12/2004 | Dunbar et al. | |
| 2004/0268224 A1 | 12/2004 | Balkus et al. | |
| 2004/0268357 A1 | 12/2004 | Joy et al. | |
| 2004/0268407 A1 | 12/2004 | Sparrell et al. | |
| 2005/0005025 A1 | 1/2005 | Harville et al. | |
| 2005/0018775 A1 | 1/2005 | Subramanian et al. | |
| 2005/0055517 A1 | 3/2005 | Olds et al. | |
| 2005/0066082 A1 | 3/2005 | Forin et al. | |
| 2005/0081158 A1 | 4/2005 | Hwang | |
| 2005/0125734 A1 | 6/2005 | Mohammed et al. | |
| 2005/0172309 A1 | 8/2005 | Risan | |
| 2005/0188311 A1 | 8/2005 | Diesel et al. | |
| 2005/0198189 A1 | 9/2005 | Robinson et al. | |
| 2005/0204289 A1 | 9/2005 | Mohammed et al. | |
| 2005/0226324 A1 | 10/2005 | Ouyang et al. | |
| 2005/0262254 A1 | 11/2005 | Sherwani | |
| 2007/0011321 A1 * | 1/2007 | Huntington et al. | 709/224 |
| 2008/0037957 A1 * | 2/2008 | Nallur et al. | 386/124 |
| 2008/0154407 A1 | 6/2008 | Carson | |

FOREIGN PATENT DOCUMENTS

| | | |
|---|---|---|
| EP | 0814403 (A1) | 12/1997 |
| JP | 2002514797 | 5/2002 |
| WO | WO9621189 (A1) | 7/1996 |
| WO | WO9957837 A2 | 11/1999 |

OTHER PUBLICATIONS

Cline, et al., "DirectShow RTP Support for Adaptivity in Networked Multimedia Applications", IEEE, 1998, pp. 13-22.

Dunn, et al., "The Design and Implementation of JaDiSM", pp. 1-38.

Robertson, Mark A.; Stevenson, Robert L.; "Temporal Resolution Enhancement in Compressed Video Sequences"; University of Notre Dame, Notre Dame, Indiana; Sep. 2001; pp. 1-11.

Girod, Bernd; Farber, Niko; "Feedback-Based Error control for Mobile Video Transmission"; Proceedings of the IEEE, v 87, n10, Oct. 1999; pp. 1707-1723.

Chien, Shao-Yi; Chen, Ching-Yeh; Huang, Yu-Wen; and Chen, Liang-Gee; "Multiple Sprites and Frame Skipping Techniques for Sprite Generation with High Subjuctive Quality and Fast Speed"; IEEE 2002; pp. 785-788.

Sullivan, et al., "Programming with the Java Media Framework", Sean C. Sullivan, Loren Winzeler, Jeanine Deagen, and Deanna Brown, 1998, pp. 99.

Agarwal, et al., "The Totem Multiple-Ring Ordering and Topology Maintenance Protocol", ACM, vol. 16, No. 2, 1998, pp. 93-132.

Bao, et al., "Topology Management in Ad Hoc Networks", ACM, 2003, pp. 129-140.

Jaffe, et al., "Automatic Update of Replicated Topology Data Base", ACM, 1984, pp. 142-148.

Shih, T. K.; "Participator Depenent Multimedia Presentation", Journal of Information Sciences, vol. 107, pp. 85-105, 1998.

Shih, T. K., Pai, W. C.; "A Stepwise Refinement Approach to Multimedia Presentation Designs", IEEE, pp. 117-122, 1997.

Samejo A. A. et al., "Graphical User Interface Based Multimedia Web Suite in Windows Evironment", Mehran Unversity Research Journal of Engineering & Technology, vol. 20, No. 2, pp. 57-68, Apr. 2001.

Shih, T. K., et al.; "A Knowledge Abstraction Approach for Multimedia Presentation", IEEE, pp. 528-532, 1997.

Lee, Sei-Hoon, Wang, Chang-Jong; "Open Multimedia/Hypermedia Application Development Environment", Inspec, 1996.

Chung, Chi-Ming et al., "A Control and Data Abstraction Approach for Multimedia Presentation", Journal of the Chinese Institute of Electrical Engineering, vol. 5, No. 3, pp. 265-276, 1998.

Olson, Robert, et al., "Remote Rendering Using Vtk and Vic," website at http://www-unix.mcs.anl.gov/fl/publications/vis00-vicvtk.pdf, 2 pages.

Engel, Klaus et al, "Remote 3D Visualization Using Image-Streaming Techniques" website at: http://citeseer.nj.nec.com/394248.html, 4 pages.

Engel, Klaus, et al., "Combining Local and Remote Visualization Techniques for Interactive Volume Rendering in Medical Applications" website at http://wwwvis.informatik.uni-stuttgart.de/eng/research/pub/pub2000/engel_vis00.pdf.

TGS website at http://www.tgs.com/pro_div/oiv_overview.htm, "Open Inventor from TGS4.0 Open Inventor Overview," printed Apr. 28, 2003, 4 pages.

"How Terminal Services Works", retrieved on May 1, 2008 at <<http://technet2.microsoft.com/windowsserver/en/library/2cb5c8c9-cadc-44a9-bf39-856127f4c8271033.mspx>>, Microsoft TechNet, updated Mar. 28, 2003, pp. 1-15.

Maharaj, "A Primitive Window System Using GDI+ and C#", retrieved May 1, 2008 at <<http://web.archive.org/web/20020605051526/http://www.csharphelp.com/archives2/archive306.html>>, from Jun. 5, 2002 archives, pp. 1-3.

Barth, et al., "Configuring Distributed Multimedia Applications Using Cinema", retrieved on Jan. 19, 2008 at <<http://ieeexplore.ieee.org/xpls/absprintf.jsp?arnumber=557748>> Published 2006, pp. 10.

Translated Japanese Office Action for JP Application No. 2005-507640, mailed on Jan. 27, 2009, 13 pgs.

Blome, et al., "Core Media Technology in Windows XP Empowers You to Create Custom Audio/Video Processing Components", retrieved on Sep. 22, 2009 at <<http://msdn.microsoft.com/en-us/magazine/cc301631.aspx>>, MSDN Magazine, 16 pages.

"DirectShow", retrieved on Sep. 22, 2009 at <<http://www.gdcl.co.uk/dshow.htm>>, Archived Oct. 17, 2002, 12 pages.

"EvCode.h", retrieved on Sep. 22, 2009 at <<http://www.lelandnsmith.com/downloads/Microsoft/DirectX%209%20SDK/sdk/Include/evcode.h>>, Microsoft, 2001, pp. 1-6.

"GstEvent", retrieved on Sep. 22, 2009 at <<http://www.gstreamer.net/docs/gstreamer/gstreamer-bstevent.html>>, GStreamer Core Reference Manual, Archived Apr. 29, 2003, pp. 1-14.

"IFileSourceFilter Interface", retrieved on Sep. 22, 2009 at <<http://msdn.microsoft.com/en-us/library/dd389981 (VS.85,printer).aspx>>, MSDN, Microsoft, Jul. 13, 2009, 4 pages.

Taymans, et al., "GStreamer Application Development Manual", retrieved on Sep. 22, 2009 at <<http://www.gstreamer.net/docs/gstreamer-manual.pdf>>, Archived Apr. 5, 2003, pp. i-iv and 1-84.

Thompson, "DirectShow for Media Playback In Windows", retrieved on Sep. 22, 2009 at <<http://www.flipcode.com/archives/DirectShow_For_Media_Playback_In_Windows-Part_I_Basics.shtml>>, Parts 1-3, Last Part Dated Sep. 13, 2000, 18 pages.

\* cited by examiner

RECONSTRUCTED FRAME CACHING

TECHNICAL FIELD

The invention pertains to multimedia processing in a computing environment.

BACKGROUND

In multimedia editing and viewing applications, there are numerous scenarios where a user may want to closely review select portions of multimedia content via scrubbing. Scrubbing is the process of moving within a piece of multimedia content such as a video to locate and present a particular section of the video. The term originally comes from the days of reel-to-reel players, when rocking a reel would give the impression of scrubbing tape across the head. Many video scrub tools today present video in a window and allow the user to drag a cursor across a timeline scrollbar to present different sections of a video to the user. That is, as the cursor is dragged across the scrollbar, the scrub tool updates the display to present that frame of the video represented by the current cursor position. Such scrubbing activities include repeated playback of a small section of content in both forward and reverse directions, displaying individual frames at times controlled by the user, or playback whose rate is finely controlled by the user.

Numerous inter- and intra-frame compression systems compress and decode bitstreams based on groups of pictures (GOP). Each GOP starts with an intracoded (I) frame and includes any number of subsequent forward predictive (P) frames and/or bidirectionally predictive (B) frames—the I-frame is always the first picture in a GOP. To decode any P or B frame in a GOP, decoding always starts with the I-Frame and proceeds to decode each frame upon which the intervening frames depend, until the selected frame is encountered and decoded. Intervening frames are frames between the I-frame and the selected frame. In the context of media decoding, frames that need to be decompressed in order to decompress a particular GOP frame are called "pre-roll frames."

Thus, the amount of time that it takes to decode a particular frame in a GOP that is not the I-frame is a function of the number of pre-roll frames that need to be decoded to decode the particular frame. In the worst case, the entire GOP must be decoded to decode the particular frame. The length of a GOP is generally based on the encoding settings and the content being encoded. For instance, a video with little or no movement between frames for significant amounts of time may have a GOP that is hundreds and even thousands of frames in length.

Application responsiveness, and by extension responsiveness of the underlying media platform, is crucial in providing a good user experience. Yet, in view of the above, to scrub to a select frame in a GOP, wherein the selected frame is not an I-frame, a scrub tool may have to perform many processing intensive and time consuming decoding operations to reach and decode a selected frame. This substantial limitation does not even take into consideration that after such a selected frame is decoded, the content of the frame may need to be transformed via one or more effects, which will increase the delay even more.

To make matters worse, some media decoders provide forward-only decompression, meaning that reverse playback rates of encoded media comprises of key and delta-frames is very slow. For instance, if a select video portion is to be scrubbed in reverse, the decoding delays already described will exponentially increase. This is because of the reverse iterative I-frame to P/B frame decoding required. (An I-frame is a key frame). In particular, to scrub a portion of video in reverse order, wherein the portion begins with a select P/B frame n, decoding progresses from the I-frame to decode all intervening frames until frame n is reached. Next, the process decodes the I-frame and all intervening frames until frame n−1 is reached. This iterative process continues until the selected portion has been scrubbed in reverse.

Accordingly, systems and methods to improve scrubbing tool performance are desired.

SUMMARY

Systems and methods for processing input media in a computing device are described. In one aspect, a reconstructed frame is cached according to a set of criteria. A request to scrub to a predictive frame of input media is received. Responsive to receiving the request, the predictive frame is decoded starting with the reconstructed frame.

BRIEF DESCRIPTION OF THE DRAWINGS

In the figures, the left-most digit of a component reference number identifies the particular figure in which the component first appears.

FIG. 3 shows that utilizing a reconstructed frame cache in a media platform pipeline can substantially reduce the amount of time to decode a frame responsive to a scrubbing request, as compared to the amount of timed consumed by traditional frame decoding techniques.

DETAILED DESCRIPTION

Overview

The following described systems and methods provide reconstructed frame caching. Reconstructed frame caching allows a media platform to cache decoded multimedia content frames (reconstructed frames) to minimize the number of frames for media pipeline decoding when a user scrubs to a portion of the content. To increase memory efficiency, one implementation of the system and method for reconstructed frame caching stores reconstructed frames as a function of destination display resolution, memory usage requests from the application, and/or other configurable criteria. These and other aspects of the systems and methods for reconstructed frame caching are now described in greater detail.

An Exemplary System for Reconstructed Frame Caching

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

Figure 1:
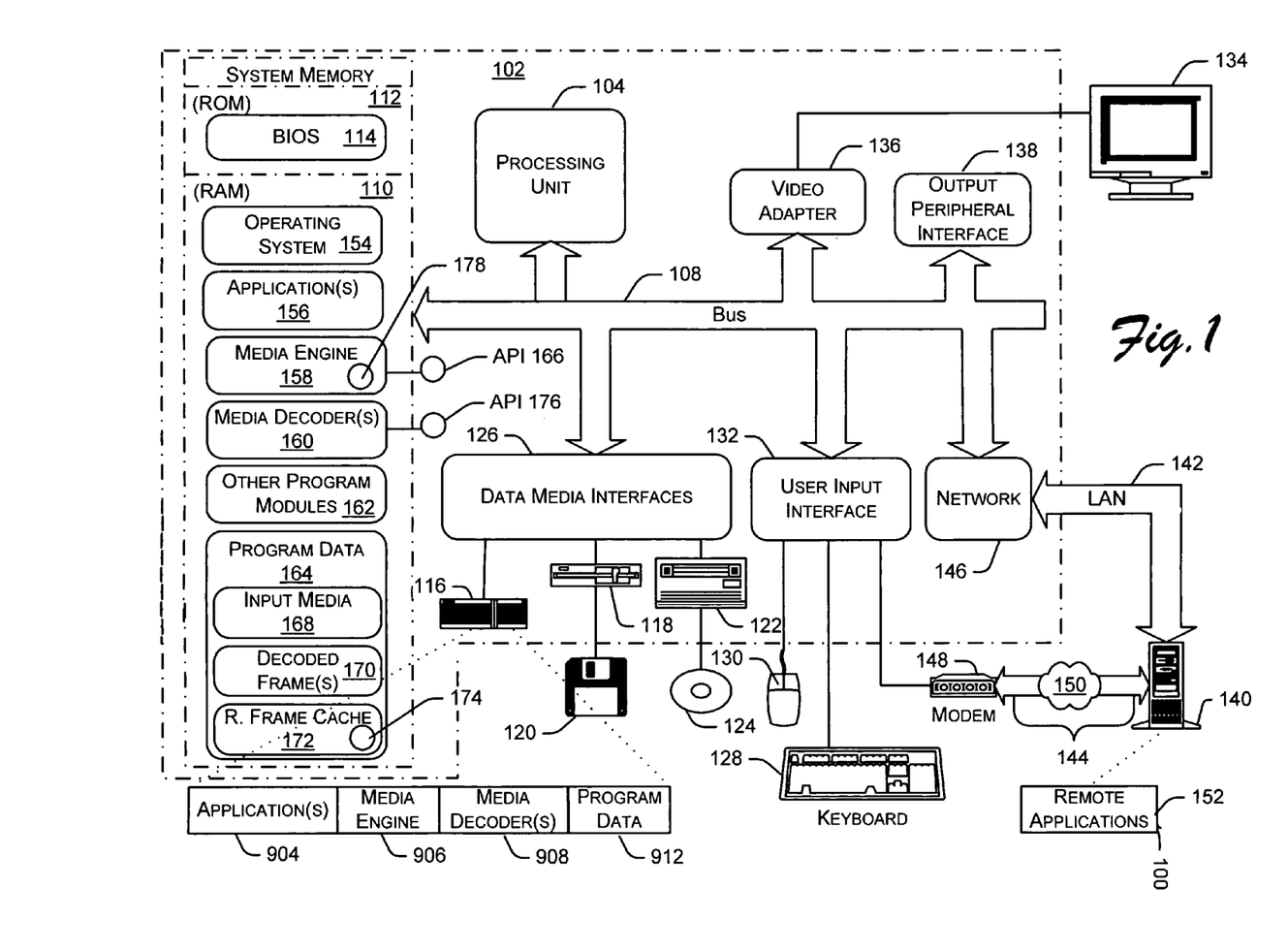
FIG. 1 illustrates an example of a suitable computing environment on which the subsequently described systems, apparatuses and methods for reconstructed frame caching may be fully or partially implemented.

FIG. 1 illustrates an example of a suitable computing environment 100 on which the subsequently described systems, apparatuses and methods for multimedia caching may be fully or partially implemented. Exemplary computing environment 100 is only one example of a suitable computing environment and is not intended to suggest any limitation as to the scope of use or functionality of systems and methods the described herein. For instance, U.S. patent application Ser. No. 10/730,401, titled "Media Processing Methods, Systems and Application Program Interfaces", filed on Dec. 8, 2003, commonly assigned herewith, and incorporated by reference, describes another exemplary computing environment within which the subsequently described systems, apparatuses and methods for multimedia caching may be fully or partially implemented. Neither should computing environment 100 be interpreted as having any dependency or requirement relating to any one or combination of components illustrated in these exemplary computing environments.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices. The invention may also be practiced in distributed computing environments where tasks are performed by remote processing devices that are linked through a communications network. In a distributed computing environment, program modules and program data for reconstructed frame caching may be located in both local and remote memory storage devices.

As shown in FIG. 1, computing environment 100 includes a general-purpose computing device in the form of a computer 102. The components of computer 102 include, by are not limited to, one or more processors or processing units 104, a system memory 106, and a bus 108 that couples various system components including system memory 106 to processor 104.

The system bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 102 typically includes a variety of computer readable media. Such media may be any available media that is accessible by computer 102, and it includes both volatile and non-volatile media, removable and non-removable media. In FIG. 1, system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 contains data and/or program modules that are immediately accessible to and/or presently being operated on by processor 104.

Computer 102 may further include other removable/non-removable, volatile/non-volatile computer storage media. For example, FIG. 1 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM/R/RW, DVD-ROM/R/RW/+R/RAM or other optical media. Hard disk drive 116, magnetic disk drive 118 and optical disk drive 122 are each connected to bus 108 by one or more interfaces 126.

The drives and associated computer-readable media provide nonvolatile storage of computer readable instructions, data structures, program modules, and other data for computer 102. Although the exemplary environment described herein employs a hard disk, a removable magnetic disk 120 and a removable optical disk 124, it should be appreciated by those skilled in the art that other types of computer readable media can store data that is accessible by a computer, such as magnetic cassettes, flash memory cards, digital video disks, random access memory (RAM), read only memory (ROM), and the like, may also be used in the exemplary operating environment.

A user may provide commands and information into computer 102 through input devices such as keyboard 128 and pointing device 130 (such as a "mouse"). Other input devices (not shown) may include a microphone, joystick, game pad, satellite dish, serial port, scanner, camera, etc. These and other input devices are connected to the processing unit 104 through a user input interface 132 that is coupled to bus 108, but may be connected by other interface and bus structures, such as a parallel port, game port, or a universal serial bus (USB). A monitor 134 or other type of display device is also connected to bus 108 via an interface, such as a video adapter 136. In addition to monitor 134, personal computers typically include other peripheral output devices (not shown), such as speakers and printers, which may be connected through output peripheral interface 138.

Computer 102 may operate in a networked environment using logical connections to one or more remote computers, such as a remote computer 140. Remote computer 140 may include many or all of the elements and features described herein relative to computer 102. Logical connections shown in FIG. 1 are a local area network (LAN) 142 and a general wide area network (WAN) 144. Such networking environments are commonplace in offices, enterprise-wide computer networks, intranets, and the Internet.

When used in a LAN networking environment, computer 102 is connected to LAN 142 via network interface or adapter 146. When used in a WAN networking environment, the computer typically includes a modem 148 or other means for establishing communications over WAN 144. Modem 148, which may be internal or external, may be connected to system bus 108 via the user input interface 132 or other appropriate mechanism. Depicted in FIG. 1, is a specific implementation of a WAN via the Internet. Here, computer 102 employs modem 148 to establish communications with at least one remote computer 140 via the Internet 150.

In a networked environment, program modules depicted relative to computer 102, or portions thereof, may be stored in a remote memory storage device. Thus, e.g., as depicted in FIG. 1, remote application programs 152 may reside on a memory device of remote computer 140. It will be appreciated that the network connections shown and described are exemplary and other means of establishing a communications link between the computers may be used.

The systems and methods for reconstructed frame caching technology are described with reference to acts and symbolic representations of operations that are performed by one or more computing devices, unless indicated otherwise. As such, it is understood that such acts and operations are computer-executed in that they include the manipulation by a processing unit of electrical signals representing data in a structured form. This manipulation transforms the data or maintains it at locations in the memory system of the computing device, which reconfigures or otherwise alters the operation of the computing device The data structures where data is maintained are physical locations of the memory that have particular properties defined by the format of the data. However, while the systems and methods are being described in the foregoing context, acts and operations described hereinafter may also be implemented in hardware.

Exemplary Program Modules and Data for Reconstructed Frame Caching

A number of program modules are stored on the hard disk, magnetic disk 120, optical disk 124, in ROM 112, and/or in RAM 110, including, e.g., an operating system (OS) 154, application(s) 156, media engine 158, media decoder(s) 160, other program modules 162, and program data 164. The OS provides a runtime environment via conventional functions such as file management, event handling, processes and threads, memory management, user interfaces (e.g., windowing, menus, dialogs, etc.), security, authentication, verification, and so on.

Application(s) 156 interface with media engine 158 and a number of media transform modules which include media decoder(s) 160. Media decoder(s) 160 decode input media 168, which includes any combination of audio, video, and image data. The media transform modules are represented by "other program modules" 162 and include, for example, objects that manipulate data. These transforms may include video, audio, and/or image encoders, splitters, multiplexers, video and/or audio processors. For instance, a transform module may be used to convert decoded image data from one data format to another format suitable for display on a monitor 134. The media engine 158 and media transform modules comprise a media platform that is independent of application(s) 156.

Application(s) 156 interface with media engine 158 via application programming interface (API) 166 to access media processing functionality of the media platform. Such media processing functionality is directed to the decoding and possible transformation of input media 168 for presentation to a media sink (e.g., video adapter 136, data media interfaces 126, and/or the like). Details of API 166 are discussed below in the section titled "An Exemplary Reconstructed Frame Caching API." Responsive to receiving a request from an application 156 to process input media 168, the media engine 158 communicates with other modules of the media platform.

Input media 168 includes, for example, any multimedia content encoded according to an intra- and inter-frame compression technique. There are numerous known intra- and inter-frame compression algorithms such as those used to produce MPEG and WINDOWS Media Video files. As such, input media 168 includes multimedia content (e.g., frames) organized with respect to one or more groups of pictures (GOP), including I-frames, P-frames, and B-frames. In this implementation, input media 170 can be parsed, or searched for specific frames, and thereby provides frame-level access. For example, input media 168 is a video/audio file stored locally in system memory 106.

To decode compressed input media 168, media engine 158 interfaces with one or more media decoders 160, for instance via a media processor 178. An exemplary such media processor 178 in a media platform architectural implementation alternate to that described with respect to FIG. 1, and within which the systems and methods for reconstructed frame caching described herein could be implemented, is described in U.S. patent application Ser. No. 10/603,328, titled "Media Foundation Media Processor", filed on Jun. 25, 2003, commonly assigned herewith, and incorporated by reference. In terms of the overall media pipeline architecture of FIG. 1, and for purposes of this discussion, the media processor 178 is used in the context of the media engine 158.

In one implementation, a media decoder 160 is a plug in transform module for decoding a specific type of input media file such as a WMV or MPEG file. Media decoder(s) 160 process the input media 168 to generate decoded frame(s) 170. The data format of decoded frame(s) 170 can be any type of data format as a function of the specific implementation of the media decoder(s) 160. The media engine 158 sends decoded frame(s) 170 to one or more media sinks (e.g., the video adapter 136 for presentation of the decoded frame(s) 170 onto display device 134, and/or the like) and/or other type of media processing module such as a transformation/effect module (i.e., respective ones of "other program modules" 162).

A Reconstructed Frame Cache

The systems and methods for reconstructed frame caching provide media platform pipeline components to decode input media 168 and store select ones of the decoded and possibly effect transformed frames into reconstructed ("R") frame cache 172 according to a set of criteria. Decoded input media 168 is represented as decoded frames 170. Each frame stored in the reconstructed ("R") frame cache 172 is hereinafter referred to as a reconstructed frame 174.

In this implementation, by default, reconstructed frames 174 are cached after the decoding operation, at or by the media decoder(s) 160. This default operation populates frame cache 172 with decoded and uncompressed frame(s). However, an application 156 can override this default caching location by directing the media engine 158 to coordinate reconstructed frame caching anywhere in the media pipeline, for instance, as far downstream in the media pipeline from the media decoder(s) 160 as possible, and anywhere in between. Such coordination may involve the media engine 158 directing a specific component (e.g., effect transform module) of the media pipeline to cache the reconstructed frames 174 into frame cache 172 after data transform(s) have been applied to the decoded frames 170. Thus, even though reconstructed frame 174 was initially uncompressed and decoded by a media decoder 160, post-transformation the reconstructed frame 174 may be in an intermediate data format that is not ready for presentation without additional image processing. In this scenario, the reconstructed frame 174 may be partially decoded, partially compressed, and/or so on. As such, the particular state of the reconstructed frame 174 in frame cache 172 is a function of the transform(s)—if any—applied by media platform component(s) to decoded data 170 before it is cached.

When a frame of decoded frame(s) 170 is not cached as a reconstructed frame 174, the frame is flushed from system memory 106 after being sent to a media sink such as data media interface 126, video adapter 136, and/or the like. Accordingly, only a subset of the decoded frames frame(s) 170, independent of whether decoded frames are subsequently transformed via one or more effects, are cached into the frame cache 172.

Criteria for storing select ones of the decoded frame(s) 170 into the reconstructed frame cache 172 include, for example, caching reconstructed frames 174:

at periodic time intervals;
  caching based on decoded frame size and available system memory 106 for growing the frame cache 172;
  based on application 156 specified playback rate(s);
  as a function of detected display device 134 resolution;
  upon determining by the media engine 158 (or specified by the application 156) that the application 156 repeatedly requests similar frames of input media 168;
  receiving an indication that the application 156 has reverse playback capabilities; and/or
  receiving a request from the application 156 to play a given section of content in reverse.

For example, if application 156 specifies that reconstructed frames 174 are only to be cached at a particular caching interval, then caching of reconstructed frames 174 occurs only at the application specified time intervals. Any combination of one or more of such criteria may be utilized.

In yet another example of criteria that may be used to store reconstructed frames 174, consider that typical multimedia viewers on a computer allow a user to move a scroll bar, usually located beneath and/or beside a video presentation, from side to side. This allows the user to present specific forward and/or backward video frames (scrubbing operations). How accurate the user can be in getting to a particular time point in the video (frame) using the scroll bar is dependent on the resolution of the display device screen.

This is because input media 168 is divided up into a multiple visual frames, each frame corresponding to a specific time relative to the beginning of the movie. The position of the scroll bar corresponds to a time frame of the movie. Move the scroll bar to the left edge, and the beginning of the movie is specified. Move the scroll bar to the right edge, and the end of the movie is specified. Move the scroll bar somewhere to the middle and somewhere in the middle of the movie. However, the user cannot move the scroll bar in such small increments that will actually specify/select every frame in the movie because the resolution of the screen (the number of pixels) is limited. (If an infinite amount of screen pixels were available, and the user had a very steady hand, the user could inch the scroll bar over in tiny increments to get to each frame). With this in mind, only those reconstructed frames 174 that correspond to the decoded frames 170 that can actually be selected using the scroll bar given the resolution of the screen may be cached to the frame cache 172. Techniques for determining display screen resolution are known. In one implementation, this criterion may be combined with one or more other criteria to populate the frame cache 172.

Although a reconstructed frame 174 is not an I-frame, each is completely reconstructed, meaning that all decompression operations that require information in previously decompressed frames (the pre-roll frames) in order to reconstruct the frame have been performed. As such, when the reconstructed frame 172 is not in an intermediate data format effected by a transform module, a reconstructed frame 174 can be directly presented to a media sink (e.g., video adapter 136, a data media interface 126, etc.) for processing (e.g., display, storage, audition, etc.) independent of a need to subsequently derive information (e.g., motion compensation values, and/or the like) from any other of the GOP's frames. However, and as indicated above, when a reconstructed frame is in an intermediate data format, additional processing of some sort may have to be performed before presenting to a media sink, the processing being a function of the particular effect transforms applied to the decoded data 170.

Caching of select ones of the decoded frames 170 into the reconstructed frame cache allows the described systems and methods for reconstructed frame caching to substantially reduce, and in some instances completely eliminate the amount of input media 168 that would otherwise need to be decoded responsive to a scrubbing request from an application 156. This is because frames in a GOP (a portion of input media 168) that are subsequent to a cached reconstructed frame 174 can be decoded from the reconstructed frame 174. The media engine 158 looks up the desired presentation time in its frame cache 172. The latest reconstructed frame 174 available in the desired frame's GOP that precedes the desired frame is obtained from the frame cache 172 and used as the starting point for decoding. If no such reconstructed frame 174 is in the frame cache 172, then decoding simply starts at the nearest previous I-frame. Additionally, if a reconstructed frame 174 associated with an exact match for that presentation time is found in the frame cache 172, then the reconstructed frame 174 is given as the output, and decoding is avoided. Thus, after one or more reconstructed frames 174 have been cached for any particular GOP, the number of pre-roll frames that have to be decoded to decode a predictive frame of interest may be substantially reduced, and possibly avoided altogether.

This is in stark contrast to conventional systems and techniques that require, for example, responsive to a scrubbing request for a particular P or B frame, the decoder to decode all intervening frames from the GOP's I-frame (key frame) to the particular frame of interest. We now illustrate this contrast in the examples of FIGS. 2 and 3.

Figure 2:
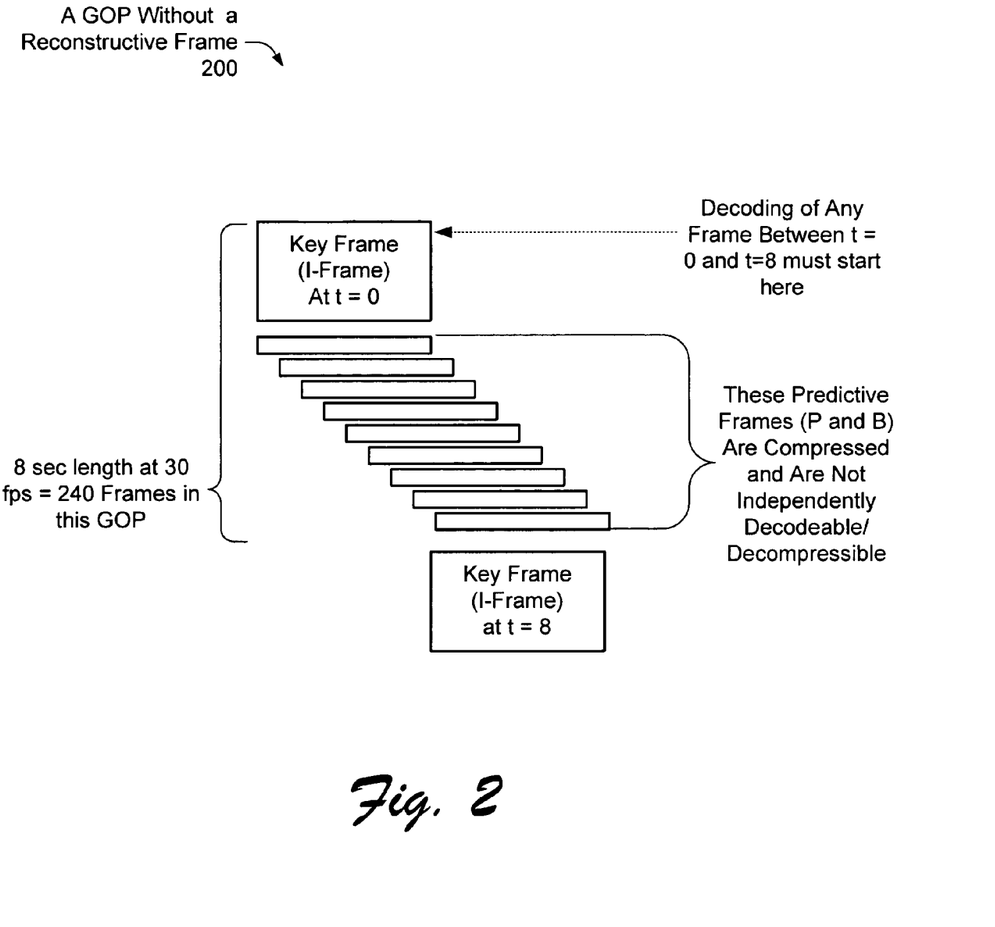
FIG. 2 shows an exemplary group of pictures to illustrate the time consuming and processing intensive nature of performing a scrubbing operation without use of reconstructed frame caching technology.

FIG. 2 shows an exemplary group of pictures (GOP) 200 to illustrate the potentially processing intensive nature of performing a scrubbing operation without use of reconstructed frame caching technology. GOP 200 represents a portion of input media 168. In this example, the length of GOP 200 is eight (8) seconds long at thirty (30) frames-per-second (fps). Thus, there are 240 frames in GOP 200. After playing some portion of a decompressed video associated with GOP 200, suppose a user directs a scrub tool (e.g., an application 156) to return to the frame at time t=7 seconds. Since GOP 200 is not associated with any reconstructed frames 174, a media decoder would decode two-hundred-and-ten (210) frames from t=0 to t=7 (at 30 fps), just to decompress a single frame at t=7. This is a substantially prohibitive amount of processing and time for decoding even a single frame. Consider that had the scrubbing request been a reverse playback request, this processing could be longer in duration (the order of this duration would be n^2, where n is key frame interval. In view of these limitations, we now show that the amount of time needed to decode a scrubbing frame of interest, can be substantially reduced when reconstructed frame technology is utilized.

Figure 3:
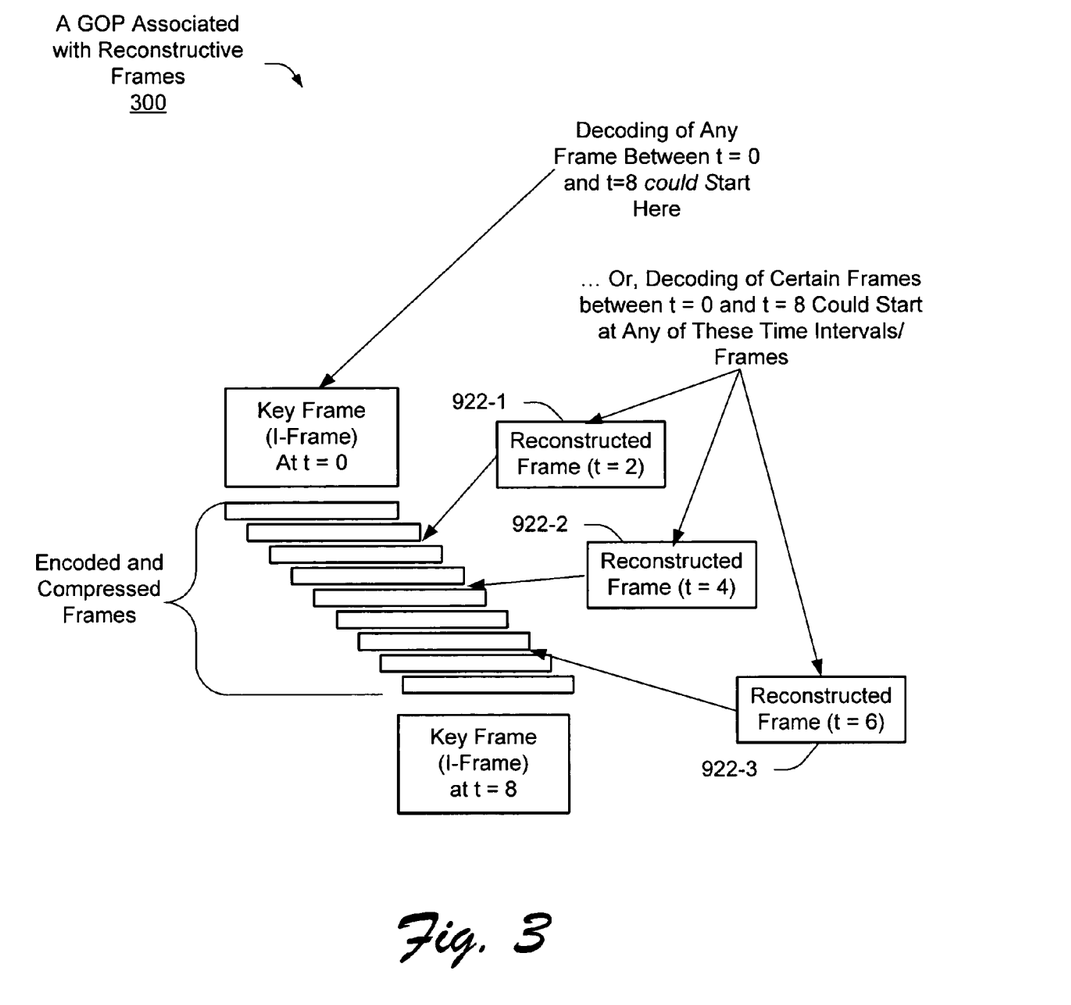
FIG. 3 shows an exemplary group of pictures to illustrate use of reconstructed frame caching technology. In particular.

FIG. 3 shows an exemplary GOP 300 to illustrate use of reconstructed frame caching technology. In particular, FIG. 3 shows that utilizing a reconstructed frame cache in a media platform pipeline can substantially reduce the amount of time to decode a frame responsive to a scrubbing request (as compared to the amount of timed consumed by traditional frame decoding techniques). In this example, GOP 300 represents an exemplary portion of input media 168. For purposes of illustration relative to the example of FIG. 2, the length of GOP 300 is 8 seconds long at 30 fps, which means that GOP 30, as does GOP 200, comprises 240 frames. In contrast to how GOP 200 was processed, as media engine 158 decodes the P and B frames 170 that comprise GOP 300, media engine 158 also caches select ones of the decoded frames 170 as reconstructed frames 174 into the frame cache 172.

In the example of FIG. 3, reconstructed frames 172-1 through 172-3 are stored in the frame cache 172. Reconstructed frames 172-1 through 172-3 respectively represent frames 170 decoded at times t=2, t=4, and t=6. In one implementation, reconstructed frames 174 are cached in an uncompressed data format, for instance, after processing by a media decoder 160. In another implementation, reconstructed frames 174 are cached in an intermediate format other than a display format in which some processing may need to be performed on the intermediate format before the reconstructed frame can be presented. For instance, in one implementation, a reconstructed frame is in at least a partially compressed, or partially decoded data format after it has been processed by a media transform module.

If a user directs application 156 to present a particular frame between t=0 and t=8, the media engine 158 can either decode the particular frame directly from the I-frame (key frame), or if there are one or more reconstructed frames 174 cached in-between the particular frame and the I-frame, substantially reduce the number of frames that need to be decoded to decide the particular frame by decoding the particular frame starting at a select one of the cached reconstructed frames 174.

In one implementation of a system and method for reconstructed frame caching, for example, if a user requests to scrub to a particular frame in the GOP 300 at some time t, wherein t between 0 and 8, the media engine 158 evaluates the reconstructed frame cache 172 to determine if there is a reconstructed frame 174 that is latest and previous with respect to the input media 168 timeline and the time of the particular frame, the frame of interest. If such a reconstructed frame 174 is located, the media engine 158 determines if there is an I-frame in the input media 168 subsequent to the time of the located reconstructed frame 174 and before the frame of interest. If not, then media engine 158 extracts the located reconstructed frame 172 from frame cache 172 and passes the extracted reconstructed frame to media decoder(s) 160. Media decoder(s) 160 decode the frame of interest directly from the extracted reconstructed frame, rather than decoding the frame of interest from the GOP's I-frame. However, if there is an I-frame in the input media 168 subsequent to the time of the located reconstructed frame 174, then the media engine 158 passes the I-frame to media decoder(s) 160 for decoding of the frame of interest.

For instance, if a user requests to scrub to a particular frame in the GOP 300 at t=7 (or any time t), media engine 158 extracts the last reconstructed frame 174 on the timeline that has a time less than that of the frame of interest (t=7). In this example, and under these criteria, media engine 158 extracts reconstructed frame 172-3 from frame cache 172. The media engine 158 passes reconstructed frame 172-3 to media decoder(s) 160. Media decoder(s) 160 decode the frame of interest at t=7, directly from the reconstructed frame 172-3—not the GOP's I-frame. This is a substantial reduction in the number of frames that need to be decoded to decode the frame of interest. Recall that 210 frames needed to be decoded in the example of FIG. 2 to decode a frame at t=7. In contrast, and as illustrated in the example of FIG. 3, only 30 compressed frames of input media 168 from t=6 to t=7 are decoded to decode the frame of interest at t=7.

Any reconstructed frames 174 in-between a GOP's I-frame and an encoded predictive frame of interest may also be used to decode the frame of interest with a reduction in the number of frames to be decoded had decoding started instead with the I-frame. For instance, although the example of FIG. 3 selected reconstructed frame 174-3, which is a previous but closest in time to the frame of interest at t=7, other reconstructed frames (e.g., reconstructed frames 174-1 or 174-2) could also have been used with less decoding efficiency than what was achieved with use of reconstructed frame 174-3, which was a previous but closest selection with respect to the frame of interest. Yet, in a GOP, use of any reconstructed frame 174 in the GOP that is between the GOP's I-Frame and the frame of interest in the GOP provides greater decoding efficiency than had decoding begun with the I-frame.

Figure 4:
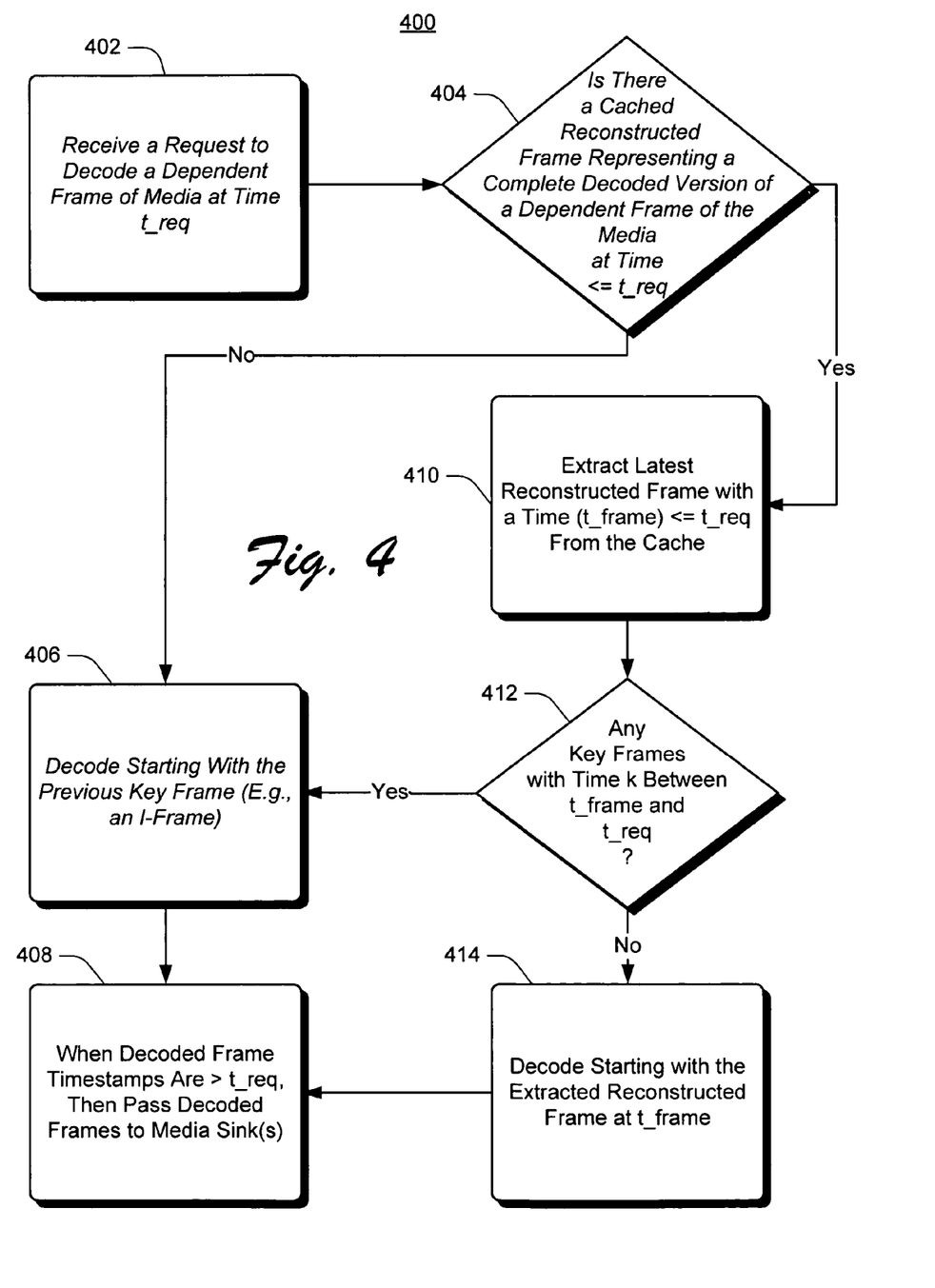
FIG. 4 shows an exemplary procedure to enable, disable, and manage caching of reconstructed frames in a media platform pipeline.

These exemplary operations to decode a frame of input media 168 using cached reconstructed frames are also shown in the exemplary procedure 400 of FIG. 4.

While an application 156 may cache frames, doing it inside a media platform makes scrubbing operations simpler to implement in the application, and further allows for efficient use of system memory 106 involved by caching only select reconstructed frames 174. For caching to be useful in the absence of reconstructed frame caching technology, the media platform or the application would need to cache full uncompressed frames for all 240 frames of the GOPs of FIGS. 2 and 3. This alternative to reconstructed frame technology requires a substantially greater and potentially prohibitive amount of memory as compared to what is utilized by caching reconstructed frames 174.

For instance, and in view of the foregoing example of FIG. 2, simply caching an uncompressed frame at t=6 would not be helpful in the illustrated scenario. This is because it would still be necessary to start decoding at the head of the GOP to obtain any frame that is not the exact frame that was cached. (I.e., conventional systems do not have a decoding mechanism to start decoding at a cached full uncompressed frame that is not a key frame to get to a subsequent predictive frame). In other words, if a cache includes full uncompressed frames, and a particular frame is requested, a media processor will look to the desired presentation time in the cache to determine if a corresponding full uncompressed frame can be identified. If an exact match for the presentation time is found, the uncompressed frame is provided as output and decoding is avoided. However, if an exact match is not found decoding must begin at the GOP's key frame.

An Exemplary Reconstructed Frame Caching API

Referring to FIG. 1, media engine 158 exposes frame caching API 166. An application 156 utilizes the frame caching API 166 to obtain various features of the media platform's frame caching service, and thereby provide the application 156 with control of how frame caching is performed by the media platform.

In this implementation, the frame caching interface 166 includes, for example, the following interfaces:
FrameCacher::EnableFrameCaching, FrameCacher::DisableFrameCaching;
ScrubbingDestination::SetPlaybackMode;
ScrubbingDestination::GetPlaybackMode; and
ScrubbingDestination::CreateScrubbingDestination.

Each of these APIs 166 are now described.

EnableFrameCaching: The application 156 calls this interface to direct the media engine 158 to cache reconstructed frames 174. When turned on, the frame cache 174 is automatically be filled with select reconstructed frames 174 from playback frames. That is, once EnableFrameCaching has been called, application 156 can fill the frame cache 172, for example, from a ScrubStartPosition to a ScrubEndPosition, simply by playing the input media 168 for which it wants reconstructed frames cached. If an application wants to begin caching reconstructed frames prior to input media playback, the application can call another the ScrubbingDestination interface, which is described below.

```
HRESULT FrameCacher::EnableFrameCaching(
    [in] GUID guidMajorType,
    [in] const GUID *pguidTransform,
    [in] DWORD cbCacheSizeLimit ,
    [in] LONGLONG hnsCacheInterval
    );
```

Parameters
  guidMajorType—A GUID, which is a substantially unique identifier, indicating which media type to cache. Media types include, for example, video, audio, etc. Since decoding of video is typically more CPU-intensive, then for example audio, this parameter is typically set to indicate video media type.
  pguidTransform—A NULL pointer indicates that the media engine 158 should make its best determination about where in the media pipeline to cache the frames. (Alternatives to caching reconstructed frames 174 immediately after decoding operations were described above). The application 156 can override this default behavior by specifying *pguidTransform to be the effect GUID of any effect (i.e., transform module) that it has added to the processing pipeline of the media platform. In this case, caching will occur at the output of the specified effect, whenever the transform is present. If the value of *pguidTransform is GUID_NULL, caching will occur directly upstream of all application 156 specified transforms.
  cbCacheSizeLimit—This parameter specifies a number indicating the maximum amount of memory that the application 156 is willing to have used for caching reconstructed frames 174. If this value is zero (0), then media engine 158 determines the limit, for example, based on some percentage of the available system memory 106, or other criteria. In this implementation, the size of the frame cache 174 is maintained on a most-recently-used basis; that is, as the cache approaches the size limit (cbCacheSizeLimit), the least recently used reconstructed frame 174 is ejected from the frame cache 172. In another implementation, selecting which reconstructed frame 174 to eject from the frame cache 172 is determined on other than a most-recently-used basis, such as with a first-in-first-out algorithm, as a function of targeted response time, system capabilities, and/or any other type of buffer management technique.
  hnsCacheInterval—This is the interval at which an application 156 is requesting that reconstructed frames 174 be cached. In this implementation, the interval is specified in hundred-nanosecond time units, although other units could be utilized as a function of system architecture. A value of 0 means that every frame (subject to the cbCacheSizeLimit limit) should be cached in the frame cache 172. Application(s) 156 may specify a nonzero interval either to increase the coverage area of the cache or because it is known that the application will be interested only in certain frames, for instance, frames corresponding to the pixels on a visible work area on a monitor 134. When the input media 168 being scrubbed is a timeline, wherein the scrubbing area straddles multiple clips, the media engine 158, or the designated media platform module, can cache reconstructed frames 174 from several clips at once.

In one implementation, unless EnableFrameCaching has been called, reconstructed frames 174 are not cached. In another implementation, when the media engine 158 detects a reverse playback operation, the media engine utilized reconstructed frame 174 caching regardless of whether the application 156 has enabled such caching.

FrameCacher::DisableFrameCaching: This API 166 allows the application 156 to turn off reconstructed frame caching. In one implementation, invoking this interface also causes the system to release any currently-cached reconstructed frames 174. For example, the DisableFrameCaching interface may be called by an application 156 when the application determines that a user has finished scrubbing input media 168.

```
HRESULT DisableFrameCaching(
    [in]    guidMajorType
    );
```

The parameter guidMajorType identifies the major type indicating what major type to stop caching. Thus, the systems and methods for caching reconstructed frames may cache more than one type of media in parallel. Valid values are those that have previously been passed to the EnableFrameCaching interface.

IScrubbingDestination::SetPlaybackMode—This method allows the application 156 to specify whether actual playback of the input media 168 should occur, or whether the frame cache 172 should simply be filled.

```
HRESULT SetPlaybackMode(
    [in] BOOL fPlayback
    );
```

The parameter fPlayback, if TRUE, allows playback/rendering of the decoded frames 170, which is the default mode. If fPlayback is set to FALSE, a destination provides media sinks that simulate playback, without actually rendering or otherwise playing the decoded frames 170 to fill the frame cache 172. A destination is an object represented by "other program modules" 162 of FIG. 1. A destination defines where decoded frames 170 are presented (e.g. a window, disk file, etc.). For instance, a destination may provide media sinks (e.g., data media interfaces 126 (FIG. 1), video adapter 136 (FIG. 1), etc.) into which decoded frame data 170 flows. Additionally, a destination can define that data is to be decoded, encoded, have effects applied thereto via transform module(s), be mixed with other data (e.g. stream mixing), and/or so on.

For example, if application 156 wants to pre-populate frame cache 172 with reconstructed frame(s) 174 before playing back any decoded frames 170, then the application uses the described ScrubbingDestination interface. In one implementation, responsive to a set playback mode of false, media engine 158 (or alternately an effect transform module) forwards the decoded frames 170 to a NOP'd media sink, although the frames are decoded and (some of them) cached as reconstructed frames 174, as discussed. Caching reconstructed frames 174 without playback will likely result in faster processing of the input media 168 than had the input media been decoded and subsequently rendered in real-time.

ScrubbingDestination::GetPlaybackMode. This method allows application 156 to retrieve the current playback mode of the Scrubbing Destination.

```
RESULT GetPlaybackMode(
    [out] BOOL *pfPlayback
);
```

The pfPlayback parameter is a pointer to a Boolean value which will be set to TRUE if the playback mode is on, and FALSE if the mode is off such that select ones of decoded frames 170 are stored in the frame cache 172 without actual playback/rendering.

Creation function—This interface creates is the creation function for Scrubbing Destinations.

```
HRESULT CreateScrubbingDestination(
    [in] IDestination *pPlaybackDestination
    [out] IDestination **ppScrubbingDestination
);
```

The pPlaybackDestination parameter specifies the destination object/components to which all calls are forwarded by the media engine 158 when the Scrubbing Destination is in playback mode. The ppScrubbingDestination parameter is a pointer to a variable that will receive the newly-created Scrubbing Destination.

An Exemplary Media Decoder API

In one implementation, media decoder(s) 160 expose API 176 comprising methods that allow media decoder(s) 158 to access reconstructed frame buffer 172. In one implementation, API 176 is used in conjunction with a standard media decoder interface. For example, API 176 may be used with Microsoft Corporation's DirectShow® Media Object API. DirectShow® provides for playback of multimedia streams from local files or Internet servers, capture of multimedia streams from devices, and format conversion of multimedia streams.

In this implementation, API 176 includes, for example, the following interfaces:

GetReconstructedFrame: The media engine 158 uses this interface to direct a media decoder 160 to access a reconstructed frame 174 from the frame buffer 172 for decoding a frame of input media 168.

SetReconstructedFrame: The media engine 158 uses this interface to direct a media decoder 160 to begin decoding input media 168 at a particular point that is not an I-Frame (key frame), but rather a particular reconstructed frame 174.

Figure 5:
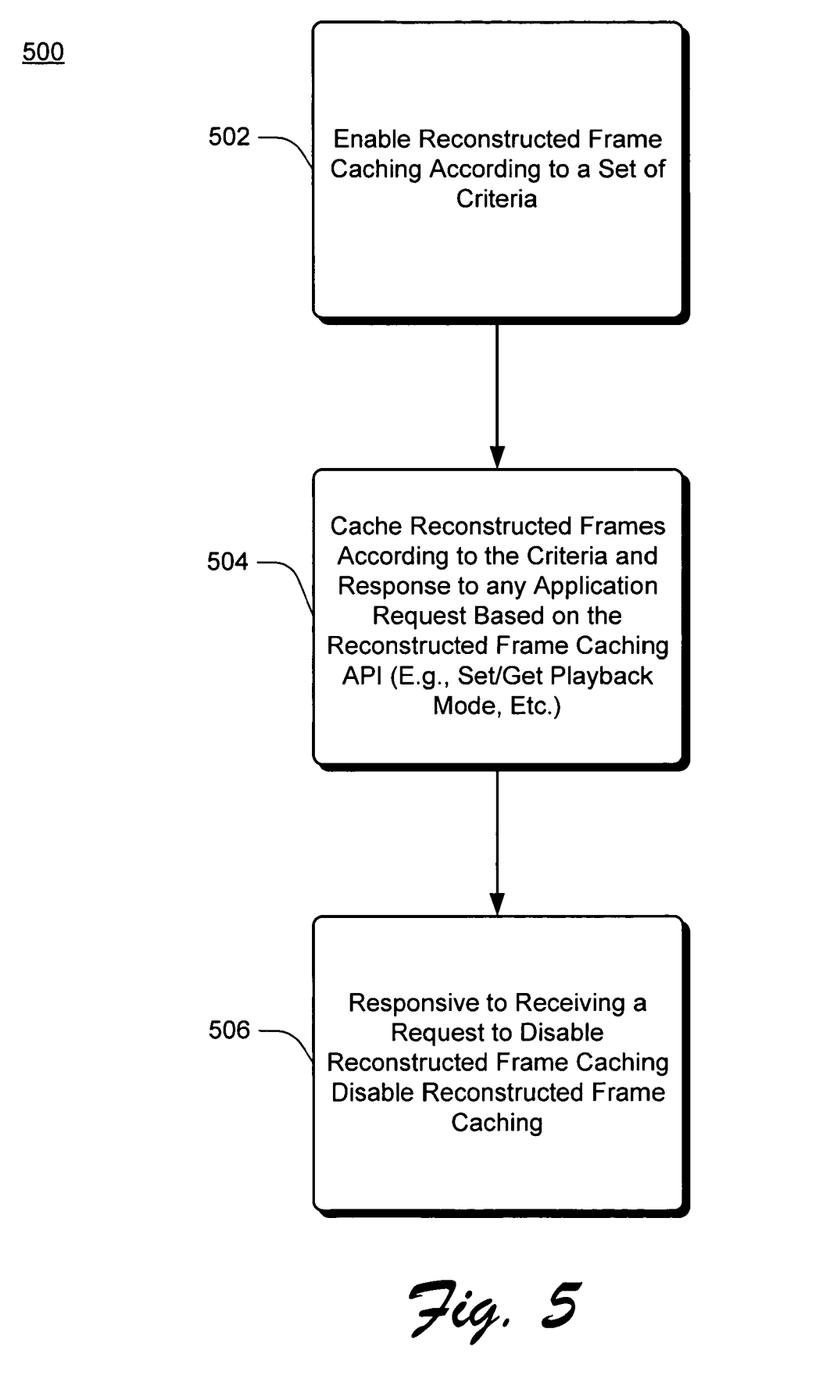
FIG. 5 shows an exemplary procedure to utilize reconstructed frames when decoding a media frame responsive to a scrubbing request.

FIG. 5 shows an exemplary procedure 500 to enable, disable, and manage reconstructed frame caching technology via the APIs 166 and 176 of FIG. 1. In particular, at block 502, the media engine 158 enables reconstructed frame caching responsive to receiving a corresponding request from an application 156, or responsive to detection, by the media engine, of a reverse playback operation of the application. As discussed, such caching may be based on any number of different criteria such as at periodic time intervals, for a period of time with respect to an input media timeline, as a function of available memory, and so on. Additionally, such criteria may indicate that reconstructed frames 174 are to be cached at a particular point in the media platform pipeline, rather than at a default location immediately after input media 168 has been decoded by a media decoder 160.

At block 504, the media engine 158, or a different media platform component specified by the media engine 158 (such specification possibly under direction of the application 156), caches reconstructed frames 174 into the reconstructed frame cache 172 according to the specified criteria (e.g., at periodic time intervals and/or other criteria, during or prior to playback). In parallel, the media engine 158 responds to any request by the Application 156 corresponding to the frame caching API 166. Such requests include, for example, Set/Get Playback Mode requests, and so on. At block 506, responsive to receiving a request from the application 156 to disable reconstructed frame caching, and independent of whether media is being played back at that moment, the media engine 158 disables reconstructed frame caching operations.

It can be appreciated that the particular ones and sequences of APIs 166 called by an application 166 are a function of the particular application's implementation.

CONCLUSION

Although the invention has been described in language specific to structural features and/or methodological operations or actions, it is to be understood that the invention defined in the appended claims is not necessarily limited to the specific features or actions described. Rather, the specific features and actions are disclosed as exemplary forms of implementing the claimed invention.

The invention claimed is:

1. A computing device for processing input media, the computing device comprising:
    a processor; and
    a physical memory coupled to the processor, the memory comprising computer-program instructions executable by the processor for:
        during playback of a media stream, caching a reconstructed frame according to a plurality of criteria, wherein the reconstructed frame comprises a decoded multimedia content frame, and wherein the criteria for caching the reconstructed frame is based on:
            a detected display device resolution,
            repeated requests for similar frames of input media,
            an indication that a playback application has reverse playback capability, and
            a received request from a playback application to play a given section of content in reverse;
        receiving a request to scrub to a predictive frame of input media, the predictive frame following an intracoded frame within a group of pictures; and
        decoding the predictive frame starting with the reconstructed frame.

2. A computing device as recited in claim 1, wherein the caching is by a media engine, a media processor, a media decoder, or an effect transform component of a media pipeline.

3. A computing device as recited in claim 1, wherein the request to scrub is sent by an application that is independent of a media processing pipeline, and wherein the criteria is further based on periodic time intervals, decoded frame size, available system memory, a requested playback rate, a detected display device resolution, and a determination that the application repeatedly requests similar frames of input media.

4. A computing device as recited in claim 1, wherein the caching is by a component in a media pipeline.

5. A computing device as recited in claim 1, wherein responsive to receiving the request and before decoding, the computer-program instructions further comprise instructions for:
   determining that there is a cached reconstructed frame representing a complete decoded version of an interframe of the input media, the cached reconstructive frame being associated with a time less than or equal to a time of the predictive frame; and
   wherein the cached reconstructed frame is the reconstructed frame.

6. A computing device as recited in claim 5, wherein the request is sent by an application that is independent of a media processing pipeline and wherein the reconstructed frame is a latest reconstructed frame in a timeline specified by the input media or the application.

7. A computing device as recited in claim 1, wherein the request is sent by an application that is independent of a media processing pipeline, and wherein the application enables reconstructed frame caching.

8. A computing device as recited in claim 1, wherein the request is sent by an application that is independent of a media processing pipeline, and wherein the computer-program instructions further comprise receiving, from the application, a location in the media processing pipeline to implement the reconstructed frame caching.

9. A computing device as recited in claim 8, wherein the location is subsequent to an effect transform component that operates on decoded frames of the input media.

10. A computing device as recited in claim 8, wherein the location is immediately subsequent to a media decoding module.

* * * * *